United States Patent
Wang et al.

(10) Patent No.: US 12,482,983 B2
(45) Date of Patent: Nov. 25, 2025

(54) QUICK-CHANGE STRUCTURE FOR LIQUID-COOLED CHARGING GUN

(71) Applicant: Suzhou Yihang Electronic Technology Co., Ltd., Jiangsu (CN)

(72) Inventors: Jihua Wang, Jiangsu (CN); Tao Yang, Jiangsu (CN); Yongjie Liao, Jiangsu (CN); Ting Lv, Jiangsu (CN)

(*) Notice: Subject to any disclaimer, the term of this patent is extended or adjusted under 35 U.S.C. 154(b) by 0 days.

(21) Appl. No.: 18/030,954

(22) PCT Filed: Dec. 15, 2022

(86) PCT No.: PCT/CN2022/139221
§ 371 (c)(1),
(2) Date: Apr. 7, 2023

(87) PCT Pub. No.: WO2024/108696
PCT Pub. Date: May 30, 2024

(65) Prior Publication Data
US 2024/0372293 A1     Nov. 7, 2024

(30) Foreign Application Priority Data
Nov. 25, 2022   (CN) .......................... 202211488671.8

(51) Int. Cl.
*H01R 13/533*      (2006.01)
*B60L 53/16*       (2019.01)
(Continued)

(52) U.S. Cl.
CPC ............ *H01R 13/533* (2013.01); *B60L 53/16* (2019.02); *B60L 53/302* (2019.02); *H01R 13/512* (2013.01)

(58) Field of Classification Search
CPC .... H01R 13/533; H01R 13/005; H01R 13/42; B60L 53/302; B60L 53/16
(Continued)

(56) References Cited

U.S. PATENT DOCUMENTS 10,340,623 B2 *  7/2019  Beimdieck ............. H01R 31/06
12,220,997 B2 *  2/2025  Takagi ................. H01R 13/512
(Continued)

FOREIGN PATENT DOCUMENTS

CN       107895856 A    4/2018
CN       209641906 U    11/2019
(Continued)

*Primary Examiner* — Hae Moon Hyeon

(57) ABSTRACT

A quick-change structure for liquid-cooled charging gun, comprises a charging connector main assembly; one side of the charging connector main assembly is fixedly connected with a terminal fixing assembly, and a detachable quick-change terminal is arranged inside the terminal fixing assembly; the front side of the charging connector main assembly is provided with a detachable quick-change gun connector head assembly. The detachable structure realizes effective saving of excessive maintenance costs, labour-hours and material costs. Worn out terminals can be completely replaced within a few minutes after the power is confirmed cut off, and no other actions are required on the charging connector end or harness end. Merely using special tools to disassemble the terminal that needs to be replaced, reassembling and resetting, the quick replacement of wearing parts can be done. Maintenance costs and technical ability requirements for maintenance and replacement are lowered, and rapid replacement and maintenance is realized.

10 Claims, 2 Drawing Sheets

(51) Int. Cl.
*B60L 53/302* (2019.01)
*H01R 13/512* (2006.01)

(58) Field of Classification Search
USPC .................................................. 439/191, 196
See application file for complete search history.

(56) References Cited

U.S. PATENT DOCUMENTS

| | | | |
|---|---|---|---|
| 2017/0279210 A1* | 9/2017 | Kraemer | H01R 13/506 |
| 2018/0269619 A1* | 9/2018 | Beimdieck | H01R 13/42 |
| 2019/0315239 A1* | 10/2019 | Beimdieck | B60L 53/16 |
| 2022/0144108 A1* | 5/2022 | Garcia-Ferre | H01R 13/05 |
| 2023/0001808 A1* | 1/2023 | Michalik | G01M 5/0033 |
| 2023/0006385 A1* | 1/2023 | Bertsch | B60L 53/302 |
| 2024/0181909 A1* | 6/2024 | Loser | H02J 7/0042 |

FOREIGN PATENT DOCUMENTS

| | | |
|---|---|---|
| CN | 111105899 A | 5/2020 |
| CN | 113844294 A | 12/2021 |
| CN | 216214279 U | 4/2022 |
| CN | 216354890 U | 4/2022 |
| CN | 217589487 U | 10/2022 |
| JP | 2019186022 A | 10/2019 |

* cited by examiner

QUICK-CHANGE STRUCTURE FOR LIQUID-COOLED CHARGING GUN

1. TECHNICAL FIELD

The invention relates to the field of new energy electric vehicle charging, in particular to a quick-change structure for liquid-cooled charging gun.

2. BACKGROUND ART

The existing charging process of new energy vehicles is connecting the charging connector of the electric energy product with charging piles to complete the charging of the product. Due to the influence of the surroundings, moisture, dust and other impurities will easily get into the terminal conductor of the charging connector during the charging process. Besides, after a certain period of accumulation of wear and tear on the plug, the temperature rise of the internal charging connector terminal will intensify. Excessive insertion and extraction force will cause deformation of the terminal contact reed, or even a short circuit, which will affect normal charging process and cause a fire hazard in severe cases. Therefore, when the charging connector is used for a certain period of time (2 years or 10,000 times of plugging and unplugging), the charging connector needs to be replaced and maintained regularly. In common cases, it is necessary to replace the entire wiring harness and install a new charging connector. At present, after-sales maintenance and repair of products produced in the market can only be done by replacing the entire set of charging connector or charging equipment, which requires expensive maintenance costs, long replacement time, and high technical expertise on replacement operation.

In actual use, the main cause is that the terminals of the conductive parts of the charging connector are worn out, resulting in excessive contact resistance, high temperature rise, and even connection failure, yet other parts can still run normally. Under this condition, if the entire charging connector is replaced directly, it will cause a lot of waste, slow replacement speed, low maintenance efficiency, and high maintenance cost. The replacement process requires power-off and reconnection of the wire harness cables, which not only involves a lot of labour, but also poses potential safety hazards.

In order to reduce the frequency of replacing the whole set of charging connector product or charging equipment, lower the time cost and material usage, and improve the efficiency as well as the effect, it is necessary to provide a charging connector whose terminal can be quickly replaced.

3. SUMMARY OF THE INVENTION

In view of this, the purpose of the invention is to provide a quick-change structure for liquid-cooled charging gun to solve the technical problems that replacing a whole set of charging connector will cause a lot of waste, slow replacement speed, low maintenance efficiency, and high maintenance cost; that the wiring harness cables need to be powered off and then reconnected during the replacement process, which not only involves a lot of labour, but also poses potential safety hazards.

In order to achieve the above purpose, the invention provides the following technical solution: a quick-change structure for liquid-cooled charging gun, comprising a charging connector main assembly; one side of the charging connector main assembly is fixedly connected with a terminal fixing assembly, and a detachable quick-change terminal is arranged inside the terminal fixing assembly; the front side of the charging connector main assembly is provided with a detachable quick-change gun connector head assembly, the detachable quick-change gun connector head assembly mechanically mates with the charging connector main assembly; a fixing screw is connected between the detachable quick-change gun connector head assembly and the charging connector main assembly, and the fixing screw can install and connect the detachable quick-change gun connector head assembly and the charging connector main assembly; an electric tube is arranged above one side of the charging connector main assembly, and the electric tube is fixedly connected to the charging connector main assembly; the terminal fixing assembly, the detachable quick-change terminal, and the electric tube are located in accommodating areas formed by the charging connector main assembly and the detachable quick-change gun connector head assembly.

Preferably, the detachable quick-change gun connector head assembly comprises a positioning ring, a circular shell, an elliptical shell, and a protective shell; the positioning ring is fixedly connected to the circular shell and the elliptical shell, the circular shell and the elliptical shell are fixedly connected, the circular shell is located above the elliptical shell, the positioning ring is located on one side of the circular shell and the elliptical shell; the positioning ring is fixedly connected with the protective shell, the protective shell is located on the side below the positioning ring, the electric tube is arranged in the circular shell, and the terminal fixing assembly mechanically mates with the protective shell.

Preferably, a group of evenly distributed through holes are arranged in the terminal fixing assembly.

Preferably, the detachable quick-change terminal comprise a front terminal, a rear terminal and a housing; the front terminal and the rear terminal are arranged inside the housing, the rear terminal is fixedly connected to the housing, the front terminal is detachably connected to the rear terminal, and the housing mechanically mates with the terminal fixing assembly.

Preferably, the front terminal is provided with a front large accommodation cavity and a front small accommodation cavity, and the front large accommodation cavity communicates with the front small accommodation cavity.

Preferably, an installation cavity is provided on the front side of the rear terminal, the interior of the rear terminal is provided with a group of second liquid holes, and the second liquid holes are connected to the rear terminal; a group of protrusions are arranged on the outer side of the rear terminal, the outer side of the protrusion is provided with spiral grooves, the rear side of the rear terminal is provided with crimping holes, the rear terminal is provided with a group of first liquid holes corresponding to the crimping holes, and the first liquid holes are connected to the crimping holes.

Preferably, the through holes are arranged inside the installation cavity.

Preferably, the housing is provided with a group of third liquid holes, and the group of third liquid holes match with the group of through holes.

Preferably, the rear terminal is fixed with the charging connector main assembly.

Preferably, the number of the electric tube is three, and the three sets of the electric tube are in the shape of two thin and one thick tubular structure.

Compared with the prior art, the invention presents the following beneficial effects:

1. Through the setting of charging connector main assembly, terminal fixing assembly, detachable quick-change terminal, detachable quick-change gun connector head assembly, fixing screw, and electric tube, the detachable structure of the invention realizes effective saving of excessive maintenance costs, labour-hours and material costs. Worn out terminals can be completely replaced within a few minutes after the power is confirmed cut off, and no other actions are required on the charging connector end or harness end. Merely using special tools to disassemble the terminal that needs to be replaced, reassembling and resetting, the quick replacement of wearing parts can be done. Maintenance costs and technical ability requirements for maintenance and replacement are lowered, and rapid replacement and maintenance is realized.

4. BRIEF DESCRIPTION OF ACCOMPANY DRAWINGS

In the figures: 1 refers to the charging connector main assembly; 2 refers to the terminal fixing assembly; 21 refers to the through hole; 3 refers to the detachable quick-change terminal; 31 refers to the front terminal; 311 refers to the front small accommodation cavity; 312 refers to the front large accommodation cavity; 32 refers to the rear terminal; 321 refers to the crimping hole; 322 refers to the first liquid hole; 323 refers to the protrusion; 3231 refers to the spiral groove; 324 refers to the second liquid hole; 325 refers to the installation cavity; 33 refers to the housing; 331 refers to the third liquid hole; 4 refers to the detachable quick-change gun connector head assembly; 41 refers to the positioning ring; 42 refers to the circular shell; 43 refers to the elliptical shell; 44 refers to the protective shell; 5 refers to the fixing screw; 6 refers to the electric tube.

5. SPECIFIC EMBODIMENT OF THE INVENTION

The technical solutions in the embodiment of the invention are further described clearly and completely with reference to the accompanying drawings in the embodiment of the invention. The embodiment described below by referring to the accompanying drawings is exemplary only for explaining the invention and cannot be construed as limiting the invention.

The embodiment is described based on the overall structure of the invention.

Figure 1:
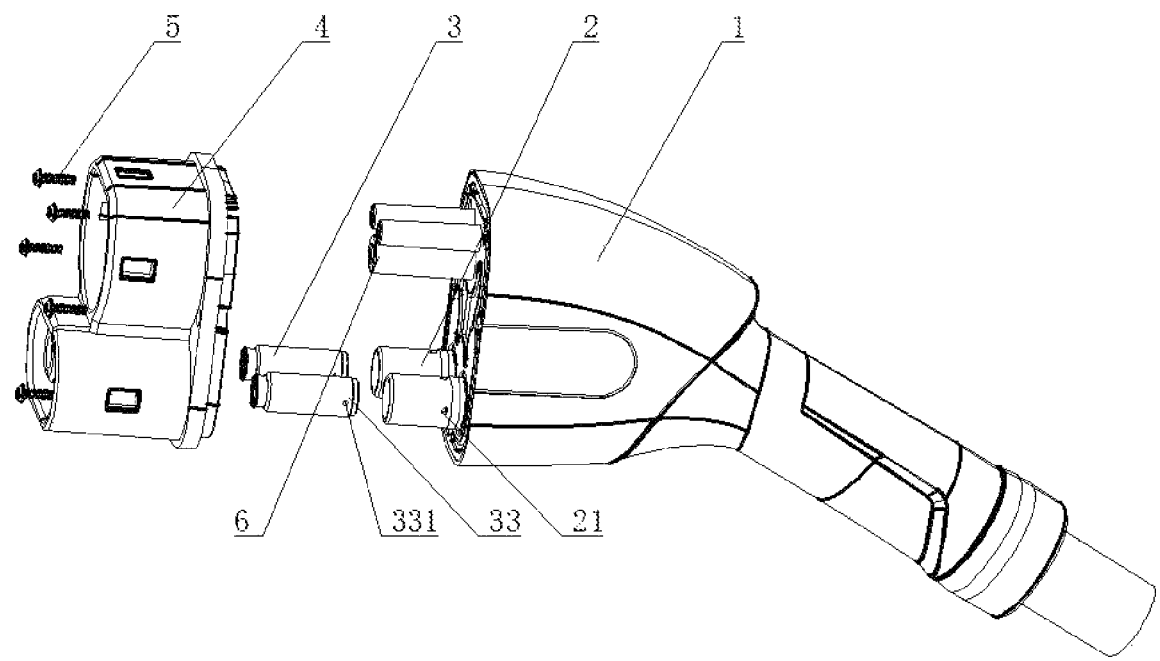
FIG. 1 is an explosion diagram of the invention.
Figure 2:
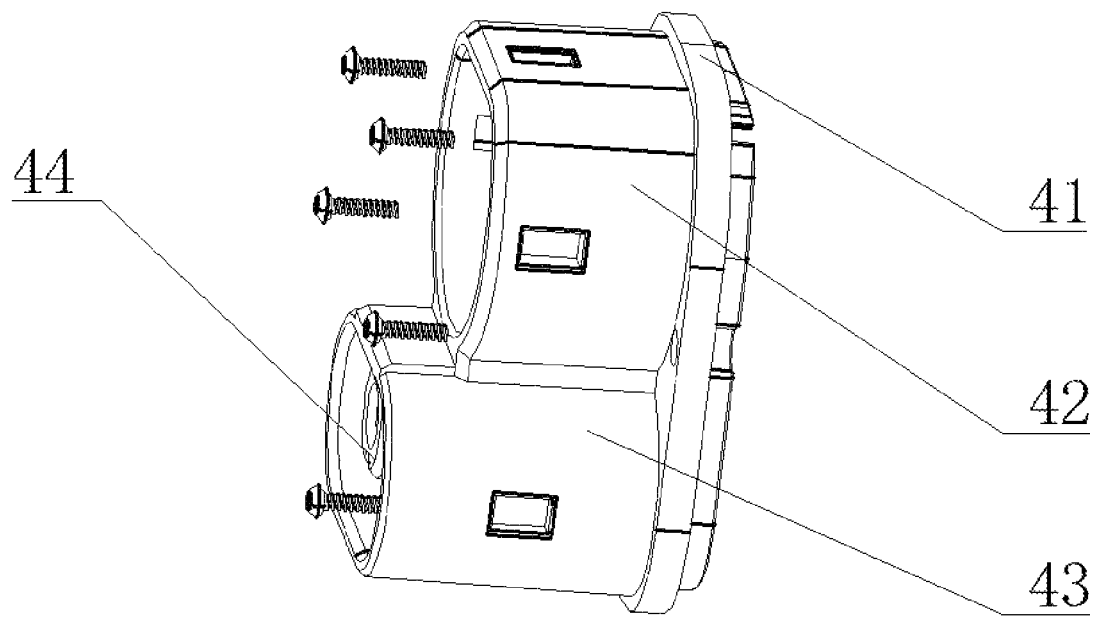
FIG. 2 is a three-dimensional structural schematic diagram of the detachable quick-change gun connector head assembly according to the invention.
Figure 3:
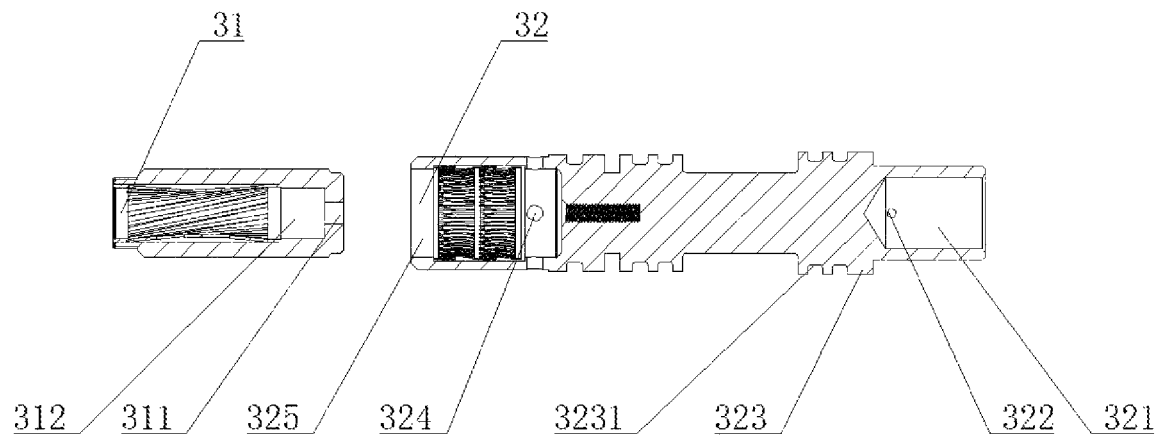
FIG. 3 is a three-dimensional structural schematic diagram of a partially section view of the detachable quick-change terminal according to the invention.

Referring to FIG. 1, FIG. 2, and FIG. 3, a quick-change structure for liquid-cooled charging gun, comprising a charging connector main assembly 1; one side of the charging connector main assembly 1 is fixedly connected with a terminal fixing assembly 2, a detachable quick-change terminal 3 is arranged inside the terminal fixing assembly 2; the detachable quick-change terminal 3 is fixedly connected to the charging connector main assembly 1, the front side of the charging connector main assembly 1 is provided with a detachable quick-change gun connector head assembly 4, the detachable quick-change gun connector head assembly 4 mechanically mates with the charging connector main assembly 1; a fixing screw 5 is connected between the detachable quick-change gun connector head assembly 4 and the charging connector main assembly 1, and the fixing screw 5 can install and connect the detachable quick-change gun connector head assembly 4 and the charging connector main assembly 1; an electric tube 6 is arranged above one side of the charging connector main assembly 1, and the electric tube 6 is fixedly connected to the charging connector main assembly 1; the terminal fixing assembly 2, the detachable quick-change terminal 3, and the electric tube 6 are located in accommodating areas formed by the charging connector main assembly 1 and the detachable quick-change gun connector head assembly 4. The design of the contact position of the charging connector adopts a detachable method, which can fix the terminal as well as being used as a wearing part for quick replacement.

The design of charging connector main assembly 1, terminal fixing assembly 2, detachable quick-change terminal 3, detachable quick-change gun connector head assembly 4, fixing screw 5, and electric tube 6 in the invention realizes the effective saving of excessive maintenance costs, labour-hours and material costs. Worn out terminals can be completely replaced within a few minutes after the power is confirmed cut off, and no other actions are required on the charging connector end and harness end. Merely using special tools to disassemble the terminal that needs to be replaced, reassembling and resetting, and the quick replacement can be done.

The detachable quick-change gun connector head assembly 4 comprises a positioning ring 41, a circular shell 42, an elliptical shell 43 and a protective shell 44; the positioning ring 41 is fixedly connected to the circular shell 42 and the elliptical shell 43, the circular shell 42 and the elliptical shell 43 are fixedly connected, the circular shell 42 is located above the elliptical shell 43, the positioning ring 41 is located on one side of the circular shell 42 and the elliptical shell 43; the positioning ring 41 is fixedly connected with the protective shell 44, the protective shell 44 is located on the side below the positioning ring 41, the electric tube 6 is arranged in the circular shell 42, and the terminal fixing assembly 2 mechanically mates with the protective shell 44.

The material of the positioning ring 41, the circular shell 42, the elliptical shell 43, and the protective shell 44 can be PVC, and be integrally injection molded. The detachable quick-change gun connector head assembly 4 is detachably installed on the front of the charging connector main assembly 1, which is convenient for disassembly, replacement and maintenance.

A group of uniformly distributed through holes 21 are provided in the terminal fixing assembly 2, and the through holes 21 mates with the third liquid holes 331. The cooling liquid enters the housing 33 through the through holes 21 and the third liquid holes 331, and enters the crimping holes 321 through the first liquid holes 322 to cool the crimping part, which presents a good cooling effect on the charging connector main assembly 1.

The detachable quick-change terminal 3 comprises a front terminal 31, a rear terminal 32 and a housing 33. The front terminal 31 and the rear terminal 32 are arranged inside the housing 33, the rear terminal 32 is fixedly connected to the housing 33, the front terminal 31 is detachably connected to the rear terminal 32, and the housing 33 mechanically mates with the terminal fixing assembly 2. The front terminal 31 and the rear terminal 32 are detachably connected to realize the detachment of the detachable quick-change terminal 3, which cooperates with the detachable connection between the detachable quick-change gun connector head assembly 4 and the charging connector main assembly 1. The detachable quick-change terminal 3 is divided into two parts, the front terminal 31 and the rear terminal 32. The front terminal 31 is the position where the male and female connectors are plugged in and electrically contacted, which is the part that can be quickly disassembled and replaced. The rear terminal 32 is a crimping part, which is fixed inside the charging connector main assembly 1.

The front terminal 31 is provided with a front large accommodation cavity 312 and a front small accommodation cavity 311, and the front large accommodation cavity 312 communicates with the front small accommodation cavity 311. The cooling liquid enters the front large accommodation cavity 312 through the front small accommodation cavity 311 to realize the overall cooling of the detachable quick-change terminal 3, which is meticulous.

The front side of the rear terminal 32 is provided with an installation cavity 325, and the inside of the rear terminal 32 is provided with a group of second liquid holes 324. The second liquid holes 324 are connected to the rear terminal 32, a group of protrusions 323 are arranged on the outer side of the rear terminal 32, and spiral grooves 3231 are arranged on the outer side of the protrusion 323. The rear side of the rear terminal 32 is provided with crimping holes 321, the rear terminal 32 is provided with a group of first liquid holes 322 corresponding to the crimping holes 321, and the first liquid holes 322 are connected to the crimping holes 321. In actual application, heat will also generate on the spiral grooves 3231, and the cooling liquid will cool along the outside of the spiral grooves 3231 to reduce the heat of the rear terminal 32.

The through holes 21 are provided inside the installation cavity 325. The inside of the installation cavity 325 is provided with through holes 21 for cooling liquid to pass.

A group of third liquid holes 331 are provided in the housing 33, and the group of third liquid holes 331 mate with the group of through holes 21. One group of third liquid holes 331 corresponds to one group of through holes 21, the two groups matching with each other.

The rear terminal 32 is fixedly connected with the charging connector main assembly 1. The rear terminal 32 is connected with the charging connector main assembly 1 after the installation is completed.

There are three sets of electric tube 6, and the three sets of electric tube 6 are in a two thin and one thick tubular structure. The electric tube 6 connects the electrical signal from the tail end of the charging connector main assembly 1, and transmits the electrical signal to the electrical connection assembly in the detachable quick-change gun connector head assembly 4, such as a charging pin.

Working principle: in practice, use special tools to remove the fixing screw 5 on the connector head, take out the detachable quick-change gun connector head assembly 4 and the quick-change terminal, namely the front terminal 31, replace it with a new quick-change terminal, and cover the detachable quick-change gun connector head assembly 4 (if the detachable quick-change gun connector head assembly 4 is worn, it can also be replaced at the same time), and tighten the fixing screw 5 to complete the quick replacement.

Cooling process: the cooling liquid enters the housing 33 through the through holes 21 and the third liquid holes 331, and enters the crimping holes 321 through the first liquid holes 322 to cool the crimping part. Then it enters the spiral grooves 3231, flows along the spiral grooves 3231 to absorb heat, and enters the installation cavity 325 through the second liquid holes 324. Then it enters the front large accommodation cavity 312 through the front small accommodation cavity 311 to realize the overall cooling of the detachable quick-change terminal 3. The content not described in detail in this specification belongs to the prior art known to those skilled in the art.

The orientation or positional relationships indicated by the terms "middle", "vertical", "horizontal", "front", "rear", "left", "right", "top", "bottom", "inner", "outer" etc. are based on the orientation or positional relationships shown in the drawing, which are only for the convenience of describing the invention and simplifying the description, but do not indicate or imply that the referred device or element must have a specific orientation, be constructed and operated in a specific orientation, and thus should not be construed as a limitation of the invention.

Although the invention has been described in detail with reference to the aforementioned embodiments, those skilled in the art can modify the technical solutions described in the embodiments, or perform equivalent replacements for some of the technical features. Any modifications, equivalent replacements, or improvements made within the spirit and principles of the invention shall be included within the protection scope of the invention.

The invention claimed is:

1. A quick-change structure for liquid-cooled charging gun, comprises a charging connector main assembly (1), one side of the charging connector main assembly (1) is fixedly connected with a terminal fixing assembly (2); a detachable quick-change terminal (3) is arranged inside the terminal fixing assembly (2); the front side of the charging connector main assembly (1) is provided with a detachable quick-change gun connector head assembly (4), the detachable quick-change gun connector head assembly (4) mechanically mates with the charging connector main assembly (1); a fixing screw (5) is connected between the detachable quick-change gun connector head assembly (4) and the charging connector main assembly (1), and the fixing screw (5) can install and connect the detachable quick-change gun connector head assembly (4) and the charging connector main assembly (1); an electric tube (6) is arranged an upper side of the charging connector main assembly (1), and the electric tube (6) is fixedly connected to the charging connector main assembly (1); the terminal fixing assembly (2), the detachable quick-change terminal (3), and the electric tube (6) are located in accommodating areas formed by the charging connector main assembly (1) and the detachable quick-change gun connector head assembly (4).

2. The quick-change structure for liquid-cooled charging gun according to claim 1, wherein the detachable quick-change gun connector head assembly (4) comprises a positioning ring (41), a circular shell (42), an elliptical shell (43) and a protective shell (44); the positioning ring (41) is fixedly connected to the circular shell (42) and the elliptical shell (43), the circular shell (42) and the elliptical shell (43) are fixedly connected, the circular shell (42) is located above the elliptical shell (43), the positioning ring (41) is located on one side of the circular shell (42) and the elliptical shell (43); the positioning ring (41) is fixedly connected with the protective shell (44), the protective shell (44) is located on lower side of the positioning ring (41), the electric tube (6) is arranged in the circular shell (42), and the terminal fixing assembly (2) mechanically mates the protective shell (44).

3. The quick-change structure for liquid-cooled charging gun according to claim 1, wherein a group of evenly distributed through holes (21) are arranged in the terminal fixing assembly (2).

4. The quick-change structure for liquid-cooled charging gun according to claim 1, wherein the detachable quick-change terminal (3) comprise a front terminal (31), a rear terminal (32) and a housing (33); the front terminal (31) and the rear terminal (32) are arranged inside the housing (33), the rear terminal (32) is fixedly connected to the housing (33), the front terminal (31) is detachably connected to the rear terminal (32), and the housing (33) mechanically mates with the terminal fixing assembly (2).

5. The quick-change structure for liquid-cooled charging gun according to claim 4, wherein the front terminal (31) is provided with a front large accommodation cavity (312) and a front small accommodation cavity (311), and the front large accommodation cavity (312) communicates with the front small accommodation cavity (311).

6. The quick-change structure for liquid-cooled charging gun according to claim 4, wherein an installation cavity (325) is provided on the front side of the rear terminal (32), an interior of the rear terminal (32) is provided with a group of second liquid holes, and the second liquid holes (324) are connected to the rear terminal (32); a group of protrusions (323) are arranged on the outer side of the rear terminal (32), the outer side of the protrusion (323) is provided with spiral grooves (3231); the rear side of the rear terminal (32) is provided with crimping holes (321), a group of first liquid holes (322) corresponding to the crimping holes (321) are provided on the rear terminal (32), and the first liquid holes (322) communicate with the crimping holes (321).

7. The quick-change structure for liquid-cooled charging gun according to claim 6, wherein the through holes (21) are also arranged inside the installation cavity (325).

8. The quick-change structure for liquid-cooled charging gun according to claim 6, wherein the housing (33) is provided with a group of third liquid holes (331), and the group of third liquid holes (331) mechanically mates with the group of through holes (21).

9. The quick-change structure for liquid-cooled charging gun according to claim 4, wherein the rear terminal (32) is fixed with the charging connector main assembly (1).

10. The quick-change structure for liquid-cooled charging gun according to claim 1, wherein the number of the electric tube (6) is three, and the three sets of the electric tube (6) are in the shape of two thin and one thick tubular structure.

* * * * *